(12) United States Patent
Tsushima et al.

(10) Patent No.: US 10,315,516 B2
(45) Date of Patent: Jun. 11, 2019

(54) DRIVING-SUPPORT-IMAGE GENERATION DEVICE, DRIVING-SUPPORT-IMAGE DISPLAY DEVICE, DRIVING-SUPPORT-IMAGE DISPLAY SYSTEM, AND DRIVING-SUPPORT-IMAGE GENERATION PROGRAM

(71) Applicant: MITSUBISHI ELECTRIC CORPORATION, Tokyo (JP)

(72) Inventors: Naoyuki Tsushima, Tokyo (JP); Shu Murayama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 363 days.

(21) Appl. No.: 15/029,564

(22) PCT Filed: Nov. 12, 2013

(86) PCT No.: PCT/JP2013/006638
§ 371 (c)(1),
(2) Date: Apr. 14, 2016

(87) PCT Pub. No.: WO2015/071924
PCT Pub. Date: May 21, 2015

(65) Prior Publication Data
US 2016/0272065 A1  Sep. 22, 2016

(51) Int. Cl.
*B60K 35/00* (2006.01)
*B60R 1/00* (2006.01)
(Continued)

(52) U.S. Cl.
CPC ............. *B60K 35/00* (2013.01); *B60R 1/00* (2013.01); *G01C 21/3602* (2013.01);
(Continued)

(58) Field of Classification Search
CPC ....... B60K 35/00; B60R 1/00; B60R 2300/80; G01C 21/3602; G01C 21/3647; G01C 21/3697; G06K 9/00818; G08G 1/16
See application file for complete search history.

(56) References Cited

U.S. PATENT DOCUMENTS 6,560,529 B1 * 5/2003 Janssen ................. G01C 21/28
340/988
7,489,303 B1 * 2/2009 Pryor ..................... B60K 35/00
345/173
(Continued)

FOREIGN PATENT DOCUMENTS

| CN | 1822522 A | 8/2006 |
|---|---|---|
| CN | 102089794 A | 6/2011 |

(Continued)

OTHER PUBLICATIONS

Third Office Action issued in corresponding Chinese Application No. 201380080870.8 dated Jul. 6, 2018, with English translation.
(Continued)

*Primary Examiner* — Behrang Badii
*Assistant Examiner* — Daniel L Greene
(74) *Attorney, Agent, or Firm* — Birch, Stewart, Kolasch & Birch, LLP

(57) ABSTRACT

A driving-support-image generation device of the present invention includes: a driving-support-image memory that stores a plurality of driving-support images each indicative of a message content of a messaging object posted on a road or around a road; and an image generator that selects from among the driving-support images stored in the driving-support-image memory, one or plural driving-support images on the basis of a pre-set order of priority, and generates using the thus-selected driving-support images, an image to be displayed on a display in a vehicle.

16 Claims, 15 Drawing Sheets

(51) Int. Cl.
*G01C 21/36* (2006.01)
*G06K 9/00* (2006.01)
*G08G 1/16* (2006.01)

(52) U.S. Cl.
CPC ..... *G01C 21/3647* (2013.01); *G01C 21/3697* (2013.01); *G06K 9/00818* (2013.01); *B60R 2300/80* (2013.01); *G08G 1/16* (2013.01)

(56) References Cited

U.S. PATENT DOCUMENTS

| | | | | |
|---|---|---|---|---|
| 7,688,221 | B2* | 3/2010 | Watanabe | B60R 1/00 |
| | | | | 180/167 |
| 8,179,241 | B2 | 5/2012 | Sakai et al. | |
| 2002/0130953 | A1* | 9/2002 | Riconda | G01C 21/36 |
| | | | | 348/115 |
| 2003/0181822 | A1* | 9/2003 | Victor | A61B 3/113 |
| | | | | 600/558 |
| 2005/0134440 | A1* | 6/2005 | Breed | B60N 2/2863 |
| | | | | 340/435 |
| 2005/0146607 | A1* | 7/2005 | Linn | B60R 1/00 |
| | | | | 348/148 |
| 2006/0017820 | A1* | 1/2006 | Kim | H04N 5/772 |
| | | | | 348/231.2 |
| 2008/0147253 | A1* | 6/2008 | Breed | B60W 30/16 |
| | | | | 701/3 |
| 2009/0128311 | A1* | 5/2009 | Nishimura | G08G 1/166 |
| | | | | 340/435 |
| 2009/0140881 | A1 | 6/2009 | Sakai et al. | |
| 2010/0023257 | A1* | 1/2010 | Machino | G01C 21/34 |
| | | | | 701/533 |
| 2010/0302361 | A1* | 12/2010 | Yoneyama | G06K 9/00818 |
| | | | | 348/135 |
| 2011/0141282 | A1 | 6/2011 | Notsu et al. | |
| 2012/0046855 | A1* | 2/2012 | Wey | G08G 1/09623 |
| | | | | 701/117 |
| 2014/0118553 | A1* | 5/2014 | Diba | G08G 1/087 |
| | | | | 348/149 |
| 2014/0327772 | A1* | 11/2014 | Sahba | G06K 9/00818 |
| | | | | 348/148 |
| 2016/0240012 | A1 | 8/2016 | Gruenler et al. | |

FOREIGN PATENT DOCUMENTS

| | | |
|---|---|---|
| DE | 102004042382 A1 | 3/2006 |
| JP | 4-5239 B2 | 1/1992 |
| JP | 2003-337040 A | 11/2003 |
| JP | 2004-171159 A | 6/2004 |
| JP | 2006-266803 A | 10/2006 |
| JP | 2007-41961 A | 2/2007 |
| JP | 2007-183764 A | 7/2007 |
| JP | 2007-225282 A | 9/2007 |
| JP | 2007-240198 A | 9/2007 |
| JP | 2009-070243 A | 4/2009 |
| JP | 2009-110394 A | 5/2009 |
| WO | WO 2015/049029 A1 | 4/2015 |

OTHER PUBLICATIONS

Office Action issued in related Indian Application No. 201647017617 dated Jan. 24, 2019.

* cited by examiner

FIG.11

| Identification Information | Content of Messaging Object |
|---|---|
| 1 | Chain Regulation |
| | Slippery |
| | Road Under Construction |
| | Side Winds Warning |
| | ⋮ |
| 2 | Right-Turn Prohibition |
| | Lane-Change Prohibition |
| | Parking Prohibition |
| | One-Way Traffic |
| | ⋮ |
| ⋮ | ⋮ |

DRIVING-SUPPORT-IMAGE GENERATION DEVICE, DRIVING-SUPPORT-IMAGE DISPLAY DEVICE, DRIVING-SUPPORT-IMAGE DISPLAY SYSTEM, AND DRIVING-SUPPORT-IMAGE GENERATION PROGRAM

TECHNICAL FIELD

This invention relates to a driving-support-image generation device, a driving-support-image display device, a driving-support-image display system and a driving-support-image generation program, for displaying a messaging object on a road or around a road, on a display in a vehicle to thereby support its driving.

BACKGROUND ART

At roads, there are posted traffic signs indicative of information about a speed limit, a parking prohibition and the like. Although a passenger in a vehicle visually recognizes these traffic signs, because of having to turn his/her sight line to each traffic sign, the passenger often overlooks the traffic sign. In order to allow the passenger, when overlooked such a traffic sign, to confirm the overlooked traffic sign, there has been invented such a technology in which a road front-scenery image is acquired by a camera mounted on the vehicle, and a traffic sign is recognized from the acquired image and is then displayed on a display (for example, Patent Document 1).

CITATION LIST

Patent Document

Patent Document 1: Japanese Examined Patent Publication No. H04-5239

SUMMARY OF THE INVENTION

Problems to be Solved by the Invention

However, in the technology described in Patent Document 1, what is done is only to display an image of the most recent traffic sign captured by the camera, on the display. Thus, according to the technology described in Patent Document 1, it is unable to retroactively confirm images of a plurality of traffic signs, resulting in an inconvenient technology. In particular, when there are consecutively posted a plurality of traffic signs during traveling of the vehicle, the traffic signs are consecutively displayed, so that, before making confirmation of a displayed traffic sign, the next traffic sign may be displayed, and thus, there is also a necessity to make follow-up confirmation.

In order to solve the problem as described above, an object of this invention is to provide a driving-support-image generation device, a driving-support-image display device, a driving-support-image display system and a driving-support-image generation program, which make it possible to retroactively confirm a messaging object, such as a traffic sign, or the like.

Means for Solving the Problems

A driving-support-image generation device of the invention is characterized by comprising: a driving-support-image memory that stores a plurality of driving-support images each indicative of a message content of a messaging object posted on a road or around a road; and an image generator that selects from among the driving-support images stored in the driving-support-image memory, one or plural driving-support images each indicative of the message content of the messaging object posted on the road or around the road that, when a vehicle travels to a destination point, has been passed to a current location on the basis of a pre-set order of priority, and generates using the thus-selected driving-support images, an image to be displayed on a display in a vehicle.

A driving-support-image display device of the invention is a driving-support-image display device which comprises a display that displays a driving-support image indicative of a message content of a messaging object posted on a road or around a road, and is characterized in that the display displays an image including the driving-support images indicative of the contents of one or plural messaging objects that are posted on the road or around the road that, when a vehicle travels to a destination point, has been passed to a current location, or are selected from among a plurality of messaging objects posted on a road that a vehicle has passed or around the road, on the basis of a pre-set order of priority.

A driving-support-image display system of the invention is characterized by comprising: an image capturing device that captures a messaging object posted on a road or around a road; and a driving-support-image display device which comprises: a driving-support-image memory that stores a plurality of driving-support images each indicative of a message content of the messaging object captured by the image capturing device; an image generator that selects from among the driving-support images stored in the driving-support-image memory, one or plural driving-support images each indicative of the message content of the messaging object posted on the road or around the road that, when a vehicle travels to a destination point, has been passed to a current location on the basis of a pre-set order of priority, and generates an image to be displayed, on the basis of the thus-selected driving-support images; and a display in a vehicle that displays the image generated by the image generator.

A driving-support-image generation program of the invention is characterized in that it causes a computer to implement: processing of storing, into a driving-support-image memory for storing a plurality of driving-support images each indicative of a message content of a messaging object posted on a road or around a road, said driving-support images; and image generation processing of selecting from among the driving-support images stored in the driving-support-image memory, one or plural driving-support images each indicative of the message content of the messaging object posted on the road or around the road that, when a vehicle travels to a destination point, has been passed to a current location on the basis of a pre-set order of priority, and generating using the thus-selected driving-support images, an image to be displayed on a display in a vehicle.

Effect of the Invention

The driving-support-image generation device, the driving-support-image display device, the driving-support-image display system and the driving-support-image generation program, according to the invention, make it possible to display plural driving-support images each indicative of the content of a messaging object, so that the passenger can retroactively confirm the driving-support image.

BRIEF DESCRIPTION OF THE DRAWINGS

FIG. 11 is an example of a table possessed by a messaging-object-content determination processor 44 according to Embodiment 3, in which identification information and a content of a messaging object are associated with each other.

MODES FOR CARRYING OUT THE INVENTION

Embodiment 1

Figure 1:
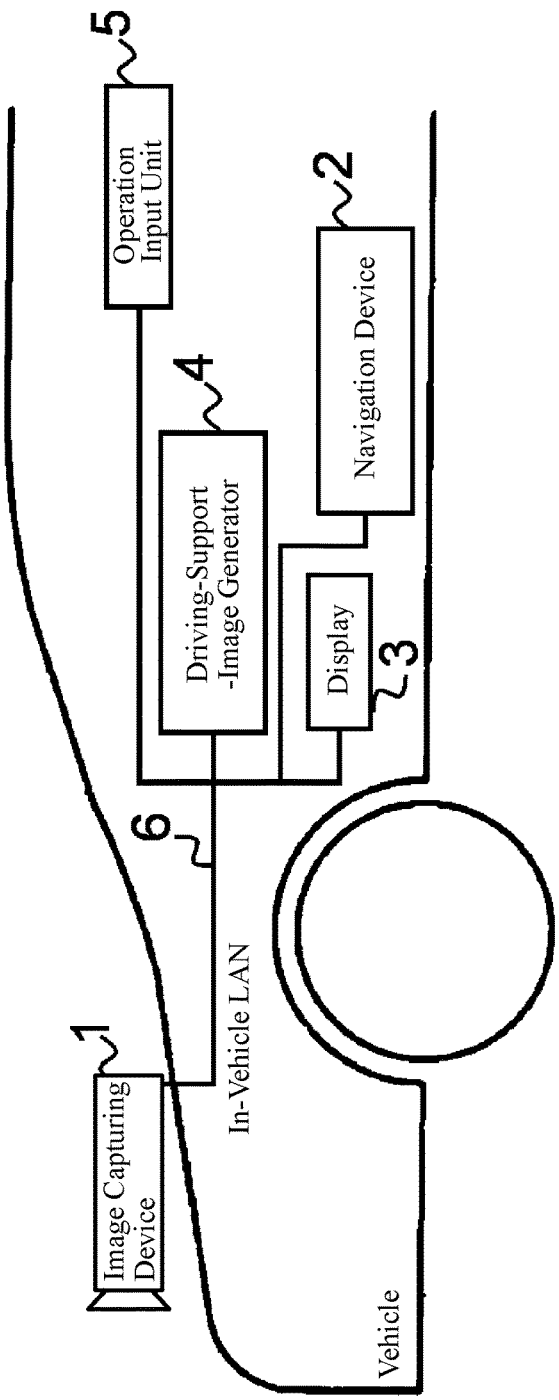
FIG. 1 is a configuration diagram of a driving-support-image display system according to Embodiment 1.

In the following, a configuration of a driving-support-image display system according to Embodiment 1 of the invention will be described using FIG. 1.

The driving-support-image display system according to Embodiment 1 includes an image capturing device 1, a navigation device 2, a display 3, a driving-support-image generator 4 and an operation input unit 5. The image capturing device 1, the navigation device 2, the display 3, the driving-support-image generator 4 and the operation input unit 5 are connected by wire or wirelessly to each other by means of an in-vehicle LAN 6. Note that the display 3 and the driving-support-image generator 4 constitute a driving-support-image display device.

The image capturing device 1 is a camera mounted on an front exterior portion of a vehicle, and captures to acquire, as an image, a scenery image including a messaging object on a road or around a road. Here, the messaging object means a traffic sign/shop sign placed on a vehicle-traveling road or around the road, or an object displaying information, such as a character painted on the road, or the like. For example, the messaging object may be an electric messaging board that is posted on the road and displays information about a traffic jam, a chain regulation, etc. to the passenger. The image capturing device 1 captures the messaging object for every predetermined time interval and outputs information related to the image thus-captured to the driving-support-image generator 4 which will be described later. Note that the image capturing device 1 is not limited to that which captures a scenery image including the messaging object for every predetermined time interval, and may be configured to capture the messaging object when it emerges in the imaging area of the image capturing device 1. Further, although the mounted position of the image capturing device 1 is given at the front exterior portion of the vehicle as shown in FIG. 1, it may be a position that allows capturing of the messaging object, and thus it is allowable that the image capturing device is placed so as to capture the outside of the vehicle from the inside of the vehicle. In the following description, a scenery image acquired by the image capturing device 1 and including the messaging object is referred to as a captured image.

The navigation device 2 includes a location identification means (not shown) that identifies a location of the vehicle using GPS (Global Positioning System), etc., and a guide means (not shown) that guides the vehicle to a set-up destination point or route point, so that the vehicle is guided, when a destination point and a route point are set by the passenger, to the destination point and the route point. The driving-support-image generator 4 that will be described later can acquire information related to the destination point, the route point and the location of the vehicle, from the navigation device 2.

The display 3 is an instrument panel in which placed are instruments for indicating information necessary for vehicle traveling, such as a speed meter, a tachometer, a fuel meter and the like, of the vehicle, and the display, upon receiving image information from the driving-support-image generator 4 that will be described later, displays the corresponding image. As instrument panels, mechanical meters have heretofore been in the mainstream; however, in recent years, replacement of mechanical displays with non-mechanical ones is going forward because of reduction in price and increase in screen size of liquid crystal display devices and the like. This causes the instrument panel to have an enhanced flexibility about the contents to be displayed, thus allowing the driving-support image and a selection screen that will be described later to be displayed, so that its convenience is particularly enhanced. Note that the display 3 is not limited to the instrument panel, and may be any one that can display an image. For example, the display 3 may be a monitor that displays a guide display of the navigation device 2, a head-up display placed behind the front glass of the vehicle, or a mobile terminal of a smartphone or like.

The driving-support-image generator 4 cuts out the messaging object from the captured image acquired by the image capturing device 1 to thereby generate an image of the messaging object to be displayed on the display 3 (hereinafter, referred to as a driving-support image). Further, the driving-support-image generator generates a screen that allows the passenger to select the driving-support image to be displayed on the display 3 (hereinafter, referred to as a selection screen).

The operation input unit 5 is an input unit that the passenger operates for displaying on the display 3, the selection screen and the driving-support image generated by the driving-support-image generator 4. The operation input unit 5 may be, for example, a selection button, an instrument panel, or a touch panel that is given as a display of the navigation device 2 or the like, and thus, may be that which can give an order to display the selection screen and the driving-support image, according to an operation by the passenger.

The in-vehicle LAN 6 connects, by wire or wirelessly, the image capturing device 1, the navigation device 2, the display 3, the driving-support-image generator 4 and the operation input unit 5 to each other. The image capturing device 1, the navigation device 2, the display 3, the driving-support-image generator 4 and the operation input unit 5 perform information exchange therebetween by way of the in-vehicle LAN 6.

Figure 2:
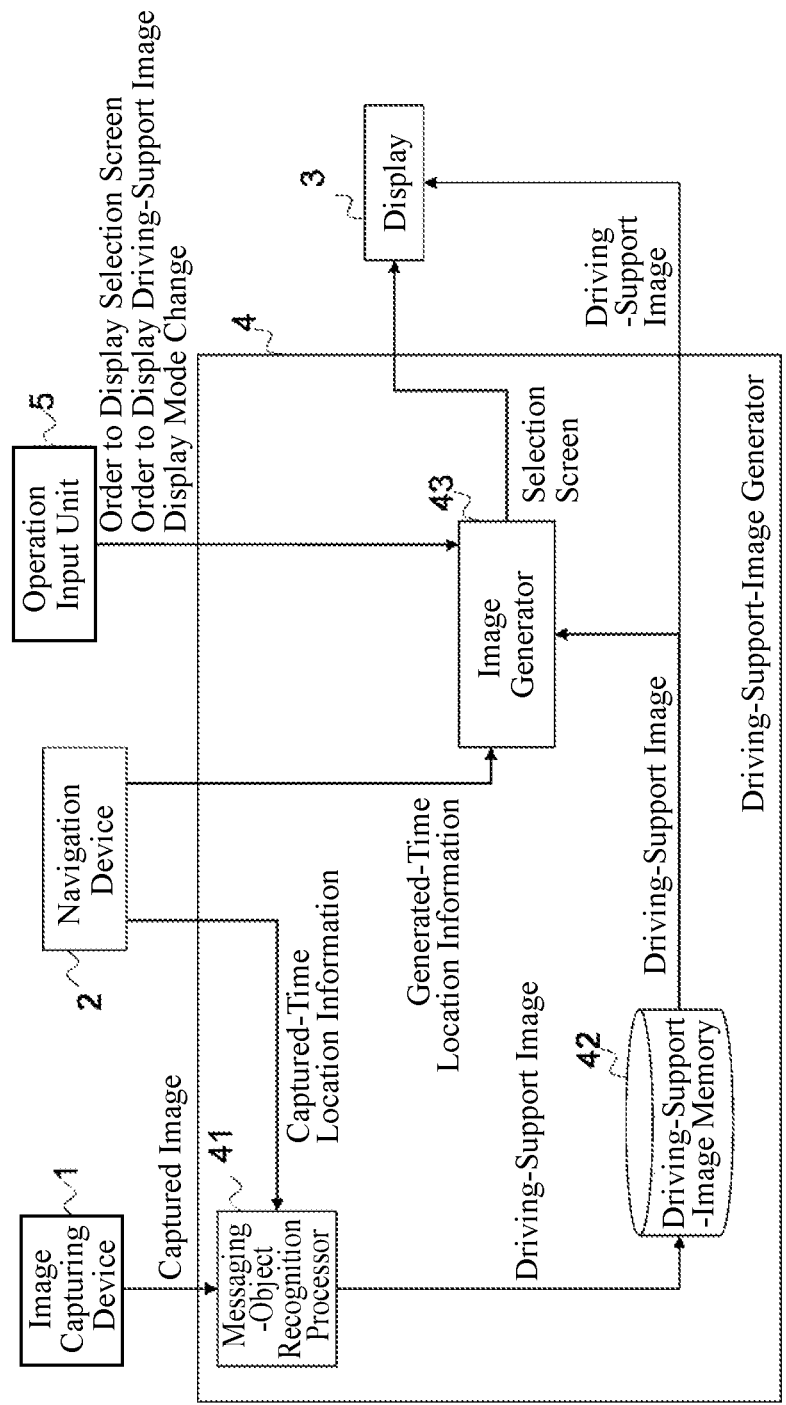
FIG. 2 is a configuration diagram of the driving-support-image display system according to Embodiment 1, which is a diagram in which a configuration of a driving-support-image generator is shown in detail.

Here, a configuration of the driving-support-image generator 4 will be described in detail using FIG. 2. FIG. 2 is a configuration diagram of the driving-support-image display system according to Embodiment 1, which is a diagram in which the driving-support-image generator is shown in detail.

The driving-support-image generator 4 includes a messaging-object recognition processor 41, a driving-support-image memory 42 and an image generator 43. Note that the messaging-object recognition processor 41 and the image generator 43 shown in FIG. 2, may be configured by hardware, or may be established by causing a computer to implement specified programs.

Figure 3:
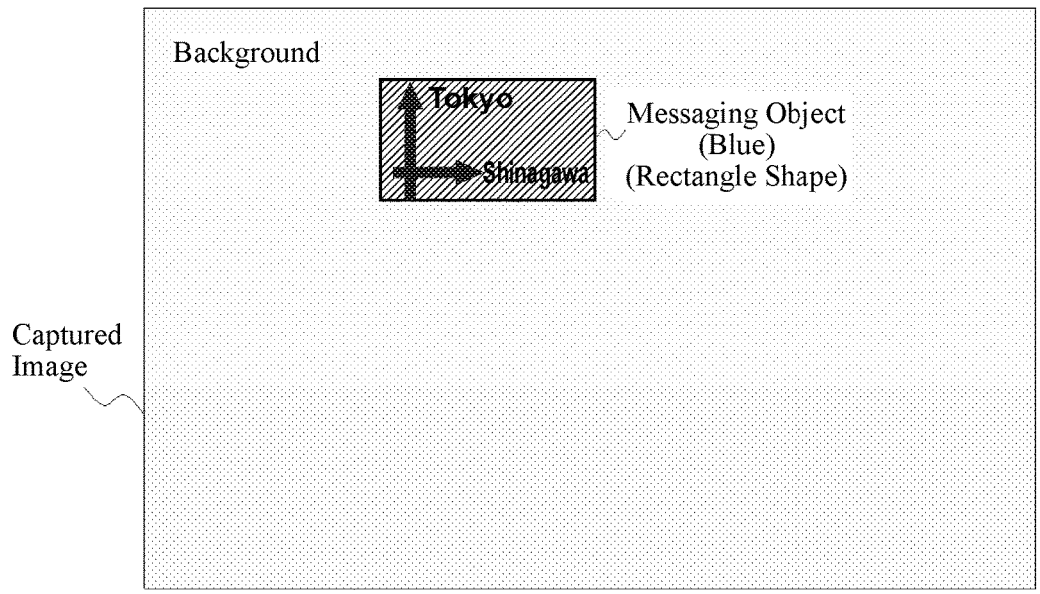
FIG. 3 is a diagram illustrating pattern matching by a messaging-object recognition processor according to Embodiment 1.

The messaging-object recognition processor 41 recognizes the messaging object from the captured image acquired by the image capturing device 1, and cuts out an area where the messaging object has been recognized. For recognition of the messaging object, a pattern matching or like method is used. Specifically, in the messaging-object recognition processor 41, information related to messaging objects are registered beforehand, and the captured image acquired from the image capturing device 1 is collated with a shape and color of each of the registered messaging objects, to thereby recognize the messaging object. For example, when a captured image including a messaging object in a blue rectangle shape as shown in FIG. 3 has been captured by the image capturing device 1, the messaging-object recognition processor 41 retrieves a blue and rectangle one from among the patterns of the messaging objects registered beforehand. When a pattern corresponding to the blue and rectangle shape is extracted as the result of retrieval, the messaging-object recognition processor 41 recognizes that the object in a blue rectangle shape in the captured image is a messaging object. When recognized the messaging object, the messaging-object recognition processor 41 cuts out an area where the messaging object has been recognized.

The driving-support image memory 42 stores information of the driving-support image cut out by the messaging-object recognition processor 41 and its identification information to be associated together, into the driving-support-image memory 42. The identification information is information for identifying the stored driving-support image and, for example, location information of the vehicle obtained from the navigation device 2. Further, the identification information is not limited to location information of the vehicle, and may be a clock time at the time of capturing, a content of the captured messaging object, an image quality of the captured messaging object, information indicating whether or not the passenger has recognized the messaging object, or the like. Hereinafter, it is assumed that the driving-support image can be identified using the identifier when information exchange of the driving-support image is performed in the processing by the driving-support-image display system. In this embodiment, the identification information is assumed to be location information of the vehicle.

The image generator 43 generates the selection screen on the basis of a pre-set display mode, and displays it on the display 3. The display mode means an operational sequence which is programmed beforehand in the image generator 43 and serves to determine an order of priority of images to be displayed in the selection screen among a plurality of driving-support images stored in the driving-support-image memory 42. The passenger can change the display mode of the image generator 43 by operating the operation input unit 5.

When, for example, the display mode for displaying "in order of closeness of a messaging object-captured location relative to a current location" is selected by the passenger, the image generator 43 generates the selection screen for displaying each driving-support image in order of closeness of the messaging object-captured location relative to the current location. In the selection screen, the driving-support image may be displayed as it is, or the identification information of the driving-support image, such as a clock time, etc., may be displayed. In the case where the identification information is displayed, the passenger selects the identification information corresponding to the driving-support image that he/she wants to display.

Figure 4:
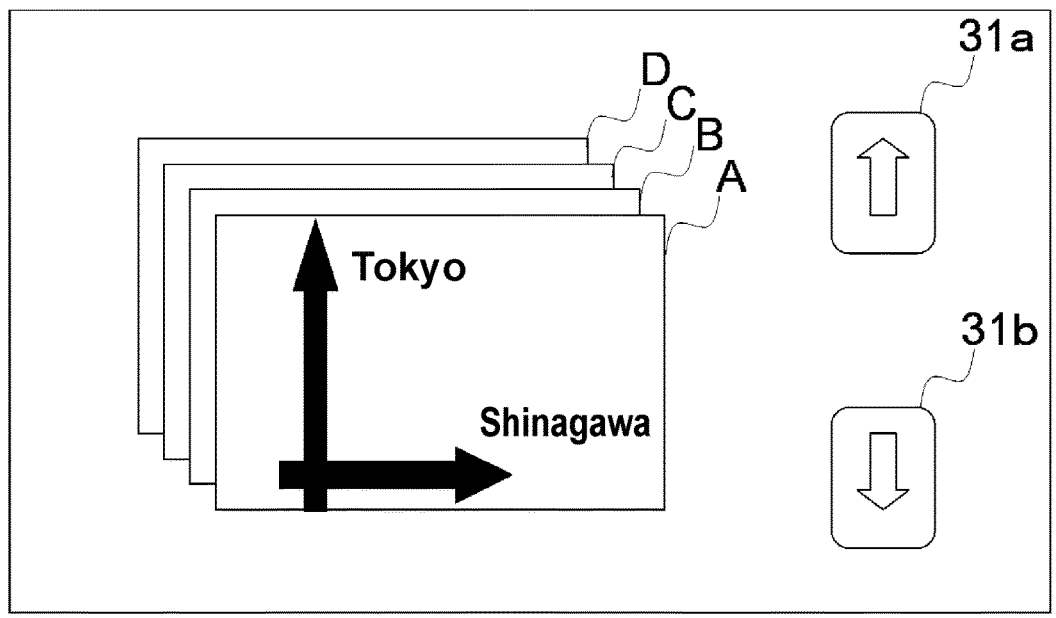
FIG. 4 is an example of a selection screen according to Embodiment 1.

FIG. 4 shows an example in which the driving-support image is displayed based on a display mode in the selection screen. When the display mode is "in order of closeness of a messaging object-captured location relative to a current location", the image initially displayed is a driving-support image A corresponding to the messaging object-captured location closest to the current location. When the passenger operates a selection button 31*a* or 31*b*, the driving-support image being displayed can be replaced. For example, when the selection button 31*b* is operated, a driving-support image B corresponding to the location next closest to the current location can be displayed. Subsequent operation of the selection button 31*b* makes it possible to successively display driving-support images C and D. Operation of the operation button 31*a* gets back to each previous driving-support image. Note that in the case where the operation input unit 5 is a mechanical button mounted on a steering wheel, etc. of the vehicle, the selection button 31 is operated by operating the cursor or the like, displayed in the selection screen on the display 3, using the operation input unit 5. Meanwhile, in the case where the operation input unit 5 is a touch panel provided in the display 3, when the passenger directly presses the selection button 31 on the display 3 by the finger, the driving-support image can be replaced.

Figure 5:
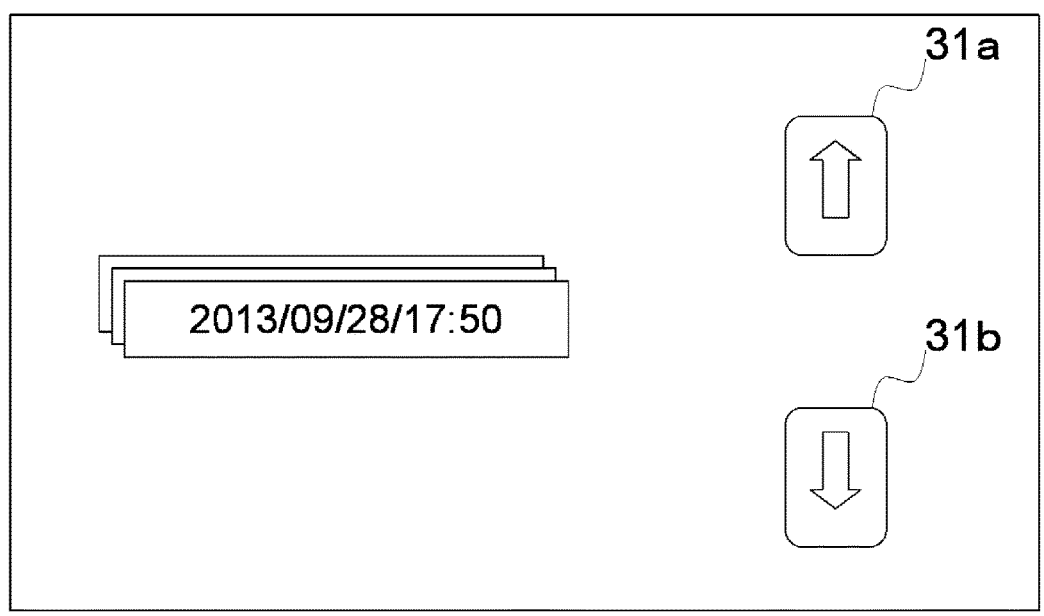
FIG. 5 is an example in which a clock-time is displayed on the selection screen according to Embodiment 1.

FIG. 5 shows an example in which a clock time that is identification information associated with the driving-support image is displayed based on a display mode in the selection screen. When the display mode is "in order of closeness of a messaging object-captured location relative to a current location", the image initially displayed is a clock time when the messaging object closest to the current location was captured. Also in this case, when the passenger operates the selection button 31*a* or 31*b*, the clock time corresponding to the driving-support image that he/she wants to display can be selected. For example, in the case where the passenger wants to display the driving-support image at the point where he/she passed 30 minutes before, selection of the clock time 30 minutes before the current time makes it possible to display the driving-support image of the messaging object captured 30 minutes before. Each display that is selectable and displayed according to the display mode, such as the driving-support image in FIG. 4 and the clock time in FIG. 5, is referred to as a selective display. Namely, the selective display is an icon or image that allows the passenger to select the driving-support image to be displayed, and is displayed on the selection screen. When the passenger selects the selective display, the driving-support-image generator 4 displays the corresponding driving-support image on the display 3. The selective display is, for example, the driving-support image itself, the identification information itself, a character corresponding to the identification information, or the like, and may be that by which the passenger can identify his/her desired driving-support image.

In the case where the identification information associated with the driving-support image is the location information of the vehicle, as the selective display, for example, the name of an intersection or the like may be used. If this is the case, it suffices to receive information related to the name of the intersection, as the location information of the vehicle, from the navigation device 2, and to store it to be associated as the identification information into the driving-support-image memory 42. If the intersection name is used as the selective display, even in such a case where the vehicle has passed A-Station during traveling toward A-Station as the destination point, the name of the intersection or the like, such as "A-Station Front-Area", etc., is displayed as the selective display, so that the passenger can easily confirm the route that he/she has mistaken.

Figure 6:
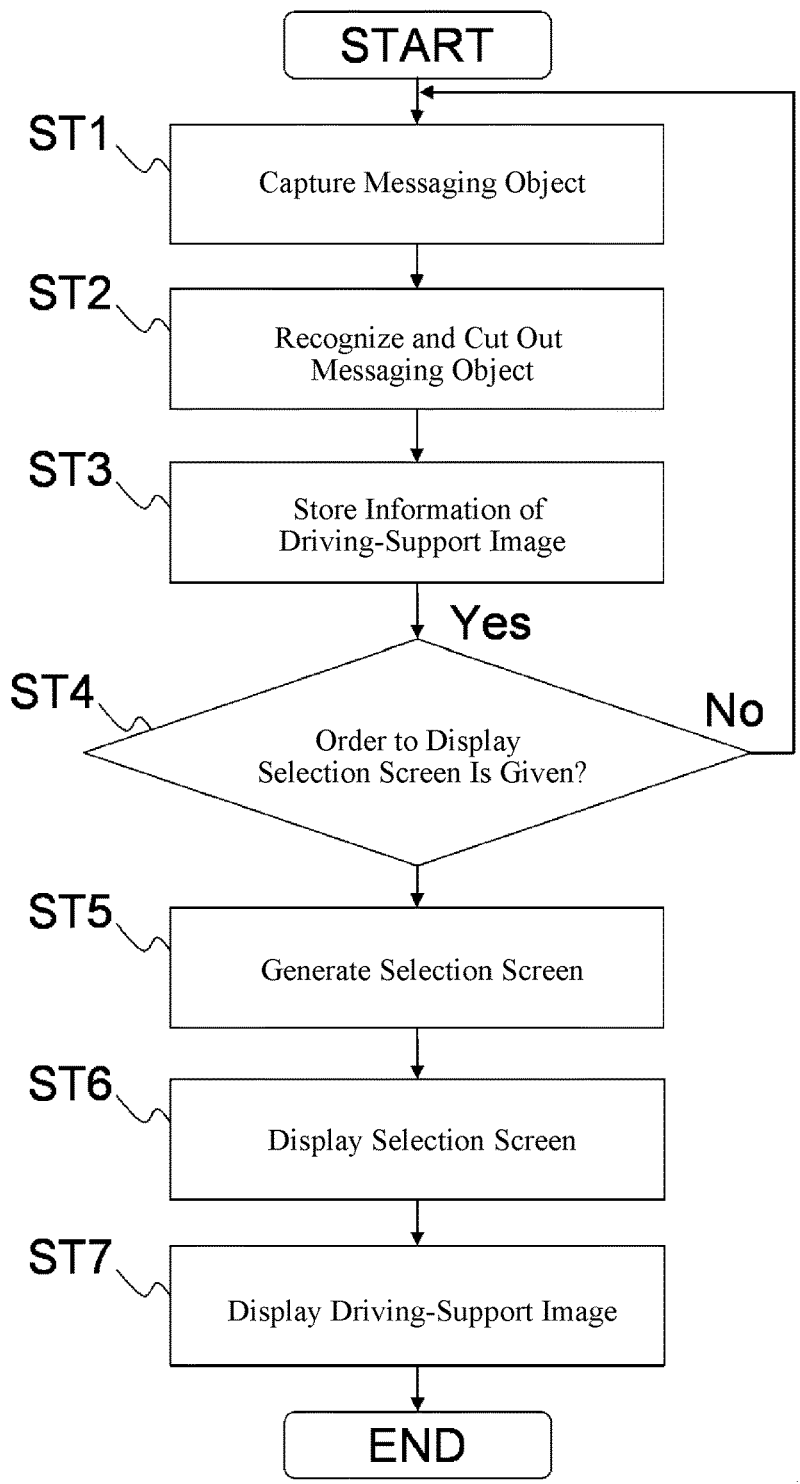
FIG. 6 is an operation flowchart of the driving-support-image display system according to Embodiment 1.
Figure 7:
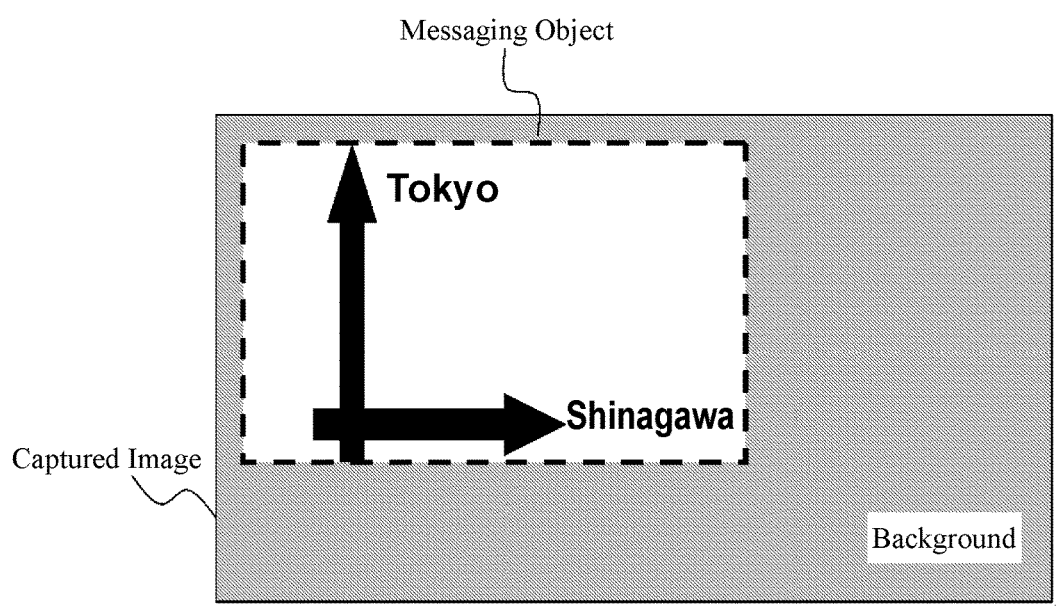
FIG. 7 is an example of a captured image captured by an image capturing device according to Embodiment 1.
Figure 8:
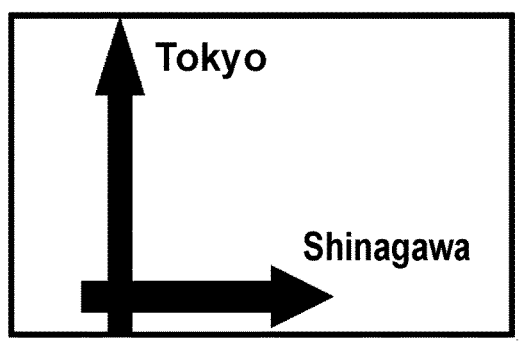
FIG. 8 is an example of a driving-support image cut out by the messaging-object recognition processor according to Embodiment 1.

In the following, operations of the driving-support-image display system according to Embodiment 1 (for ST2 and following steps, processing steps of a program according to Embodiment 1) will be described using FIG. 6 to FIG. 8. FIG. 6 is an operation flowchart of the driving-support-image display system according to Embodiment 1. FIG. 7 is an example of a captured image captured by the image capturing device according to Embodiment 1. FIG. 8 is an example of a driving-support image cut out by the messaging-object recognition processor according to Embodiment 1. In the following description, the display mode set in the image generator 43 by the passenger is assumed to be "in order of closeness of a messaging object-captured location relative to a current location". Further, the description will be made using an example in which the selective display displayed in the selection screen is the driving-support image itself.

In ST1 in FIG. 6, the image capturing device 1 captures a messaging object posted on a road or around a road. In the description of the operations of the driving-support-image display system according to this embodiment, it is assumed that the image capturing device 1 has captured a messaging object to thereby obtain the captured image exemplified in FIG. 7. The hatched area in FIG. 7 is a background other than the area of the messaging object. Further, shown within a broken-line section in FIG. 7 is the messaging object. The image capturing device 1 outputs the information of the captured image having been captured, to the driving-support-image generator 4.

In ST2, the messaging-object recognition processor 41 acquires the information of the captured image from the image capturing device 1 to thereby recognize the messaging object by pattern matching. Further, the messaging-object recognition processor 41 cuts out the area of the messaging object (within the broken-line section in FIG. 7) having been recognized as a messaging object by pattern matching, to obtain the driving-support image (FIG. 8). Further, as well as acquiring the information of the captured image, the messaging-object recognition processor 41 receives from the navigation device 2, information related to a location of the vehicle at the time the messaging object was captured (hereinafter, referred to as captured-time location information).

In ST3, the messaging-object recognition processor 41 stores the information of the driving-support image obtained by cutting-out, to be associated with the captured-time location information, into the driving-support-image memory 42.

In ST4, the image generator 43 confirms whether or not an order to display a selection screen is given from the operation input unit 5. When the order to display the selection screen is given, the image generator goes to ST5 to thereby initiate generation of the selection screen. Meanwhile, when the order to display is not given, it repeatedly executes ST1 to ST3 again. In the following description, it is assumed that the driving-support-image generator 4 has repeatedly executed ST1 to ST3 plural times, so that plural driving-support images are stored in the driving-support-image memory 42.

In ST5, the image generator 43 acquires location information of the vehicle at the time the selection screen is generated (hereinafter, referred to as generated-time location information) from the navigation device 2, to thereby initiate generation of the selection screen.

The image generator 43 reads out successively the driving-support images on the basis of the set-up display mode to thereby generate the selection screen. In the case of this example, the display mode is "in order of closeness of a messaging object-captured location relative to a current location". Accordingly, the image generator 43 compares the generated-time location information and the identification information indicative of the captured-time location information, and reads out the driving support image corresponding to the location closest to the generated-time location information, and then generates the selective display as shown in FIG. 4, to thereby generate the selection screen in which the selective display is arranged.

In ST6, the image generator 43 displays the thus-generated selection screen on the display 3. On this occasion, the passenger can replace the driving-support image displayed in the selection screen by operating the selection button 31*a* or the selection button 31*b*. For example, when the passenger operates once the selection button 31*b* shown in FIG. 4, the image generator selects the driving-support image associated with the identification information that is second closest relative to the generated-time location information, and re-generates the selection screen. Note that the operation of the selection button 31 is performed using the operation input unit 5. At every operation of the selection button 31 by the passenger, ST5 and ST6 are executed repeatedly.

When the selective display in the selection screen is selected by the passenger, in ST7, the image generator 43 selects and reads out, upon receiving an order to display a driving-support image, the driving-support image corresponding to the selective display from the driving-support-image memory 42, and displays it on the display 3.

As described above, in the driving-support-image display system according to Embodiment 1, a plurality of driving-support images each indicative of a messaging object are stored, and the driving-support image is selected according to the display mode to thereby generate the selection screen. Thus, it is possible to allow the passenger to retroactively confirm the messaging object that he/she has overlooked, and to easily retrieve the driving-support image necessary for the passenger.

Embodiment 2

In the following, Embodiment 2 will be described using FIG. 2 and FIG. 6. The driving-support-image support system according to Embodiment 2 is characterized in that it generates a selection screen using location information of a destination point or route point set in the navigation device 2 as location information of the vehicle. It is noted that the configuration of the driving-support-image display system according to Embodiment 2 is assumed to be similar to the configuration shown in FIG. 1 and FIG. 2, so that its description is omitted here.

In ST5 in FIG. 6, the image generator 43 acquires, in place of the generated-time location information, the location information of a destination point or route point set in the navigation device 2.

Further, the image generator 43 preferentially acquires from the driving-support-image memory 42, the driving-support image that is associated with, as the identification information, the acquired captured-time location information corresponding to a location near the destination point or route point, to thereby generate the selection screen.

As described above, the driving-support-image support system according to Embodiment 2 allows the passenger, when the vehicle has passed the destination point or likewise, to easily retrieve the driving-support image indicative of an intersection, etc. where the vehicle should properly make a turn.

Embodiment 3

In the following, a configuration of a driving-support-image display system according to Embodiment 3 of the invention will be described using FIG. 9 to FIG. 14. Note that with respect to the description of FIG. 9, the same reference numerals as in FIG. 1 and FIG. 2 are given to the parts equivalent to those in the configuration of the driving-support-image display system of Embodiment 1, so that their description is omitted here.

The driving-support-image display system according to Embodiment 3 is characterized in that it generates the selection screen on the basis of a content of the messaging object.

Figure 9:
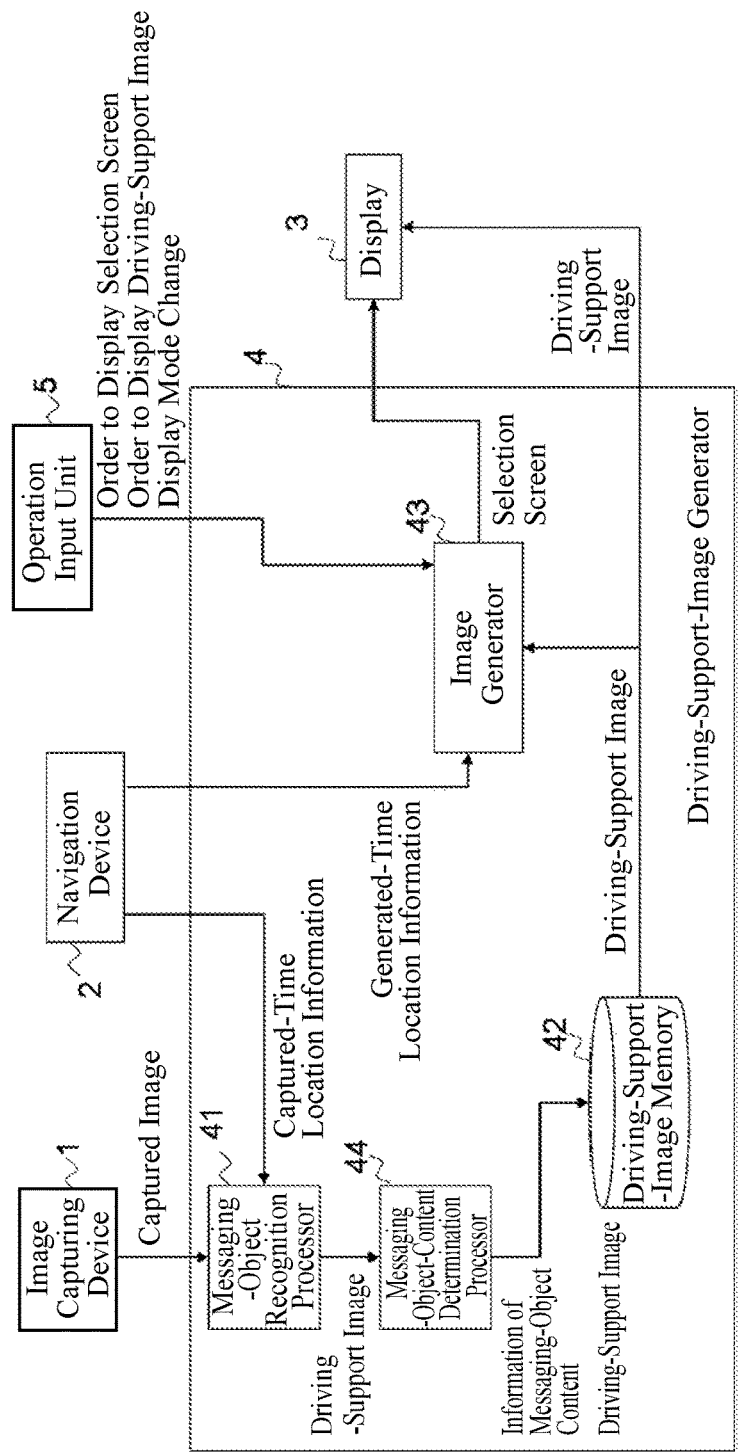
FIG. 9 is a configuration diagram of a driving-support-image display system according to Embodiment 3, which is a diagram in which a configuration of a driving-support-image generator is shown in detail.

The configuration of the driving-support-image display system according to Embodiment 3 will be described using FIG. 9, as follows. FIG. 9 is a configuration diagram of the driving-support-image display system according to Embodiment 3, which is a diagram in which a configuration of a driving-support-image generator is shown in detail.

In this embodiment, the driving-support-image generator 4 includes a messaging-object-content determination processor 44. Note that the messaging-object-content determination processor shown in FIG. 9 may be configured by hardware, or may be established by causing a computer to implement a specified program.

The messaging-object-content determination processor 44 determines a content of the driving-support image cut out by the messaging-object recognition processor 41 from the captured image, and stores identification information corresponding to the thus-determined content of the messaging object and the driving-support image, to be associated together into the driving-support-image memory 42. In this embodiment, the identification information is that which indicates an identification number predetermined based on the content of the messaging object. For example, the content of the messaging object is a classification as to whether it is a traffic sign, a shop sign, or another. Instead, the content of the messaging object may be more finely classified one and, for example, may be that which is classified to a traffic sign indicative of a safety-related content, a traffic sign indicative of a speed limit, a traffic sign indicative of a route in a specific area, a traffic sign indicative of jam-up information, a traffic sign indicative of a chain regulation, or the like.

Here, description will be made about a determination method by which the messaging-object-content determination processor 44 determines the content of the messaging object. The messaging-object-content determination processor 44 includes a character recognition means (not shown) and thus recognizes a character in the messaging object to thereby classify the content. For recognition of the character, for example, a technology of OCR (Optical Character Recognition) in which a character is identified by collating it with patterns of characters stored beforehand, or the like, is used.

Note that the messaging-object-content determination processor 44 has been described to perform character recognition as the method of determining the content of the messaging object; however, this is not limitative, and it suffices to use any method capable of determining the content of the messaging object. For example, pattern matching may be used in which information related to messaging objects has been registered beforehand, and the driving-support image is collated with a shape and color of each of the registered messaging objects, to thereby identify the messaging object.

The image generator 43 generates the selection screen on the basis of the content of the messaging object determined by the messaging-object-content determination processor 44.

Figure 10:
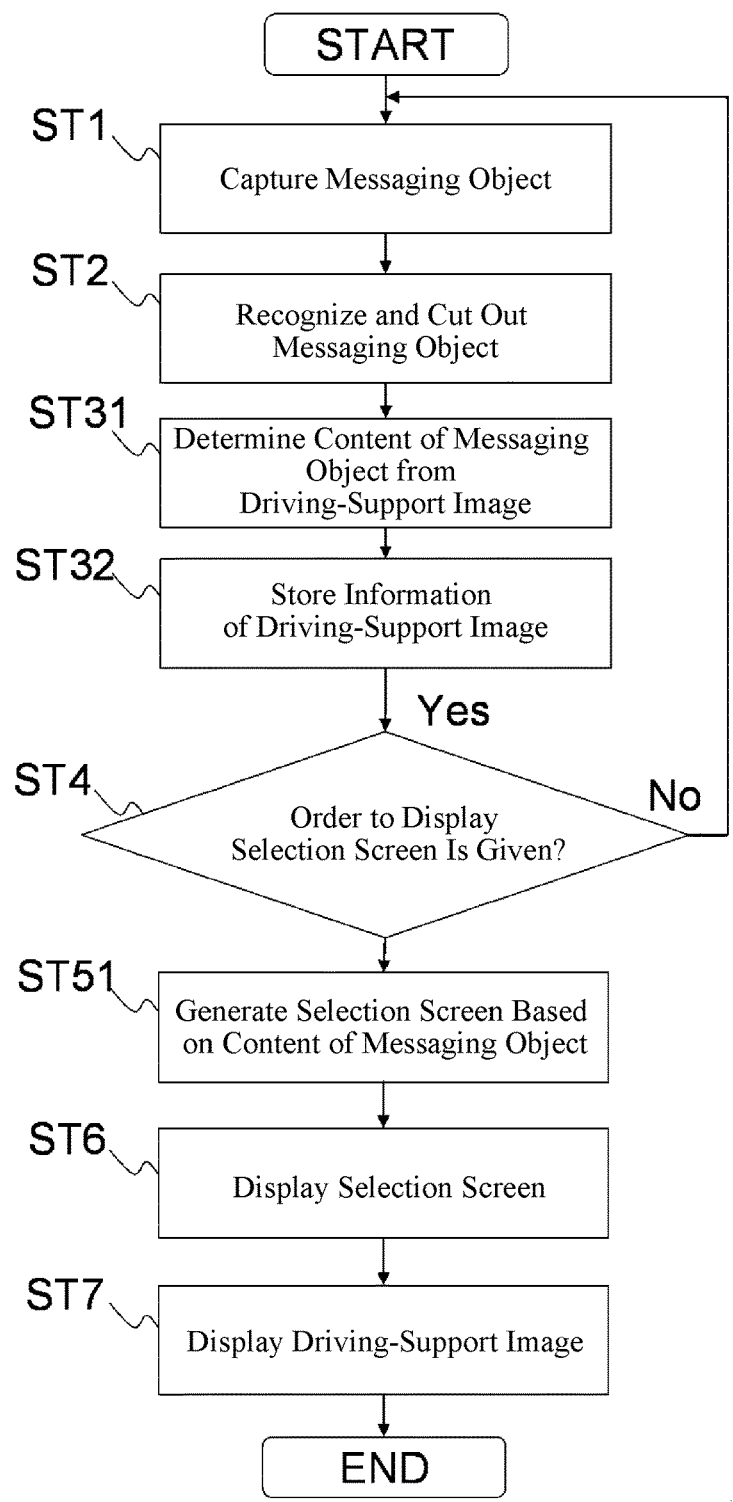
FIG. 10 is an operation flowchart of the driving-support-image display system according to Embodiment 3.
Figure 12:
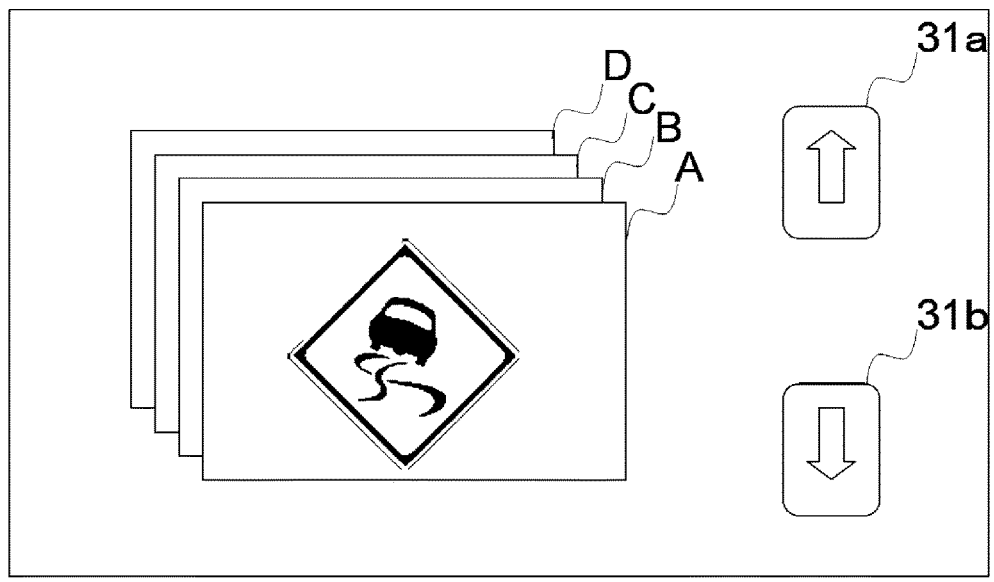
FIG. 12 is an example of a selection screen according to Embodiment 3.
Figure 13:
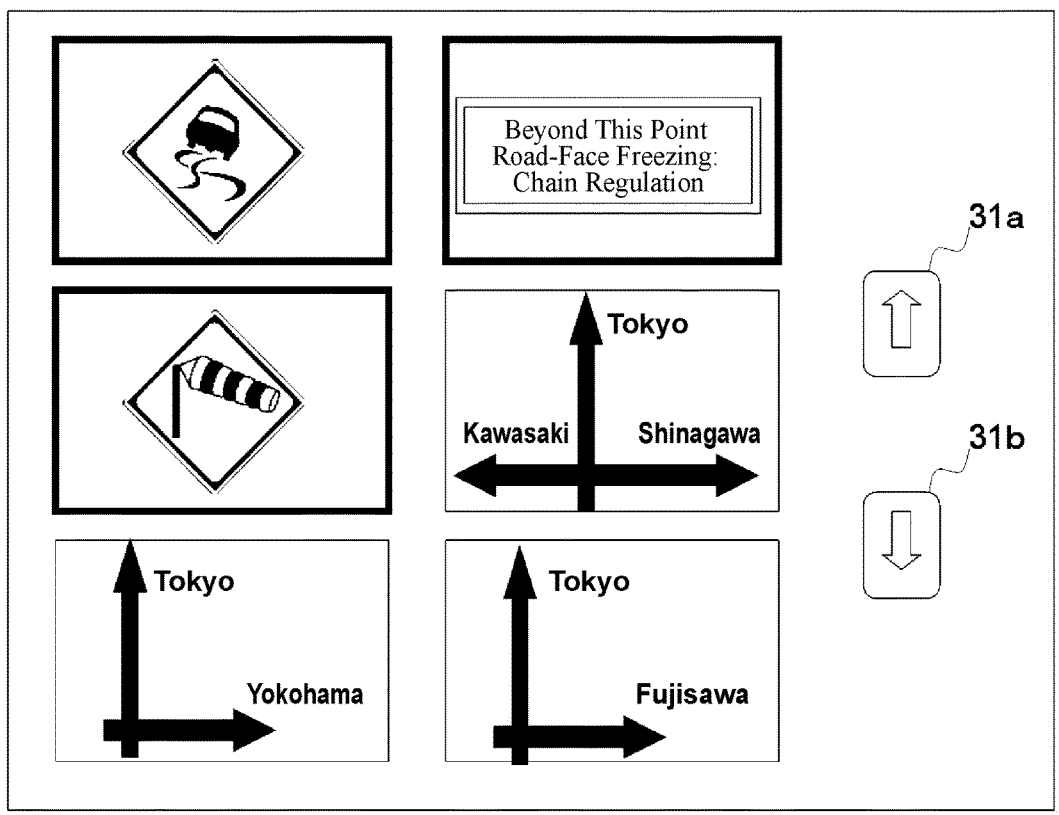
FIG. 13 is an example of a selection screen generated by an image generator according to Embodiment 3, and is an example in which selective displays are highlighted.
Figure 14:
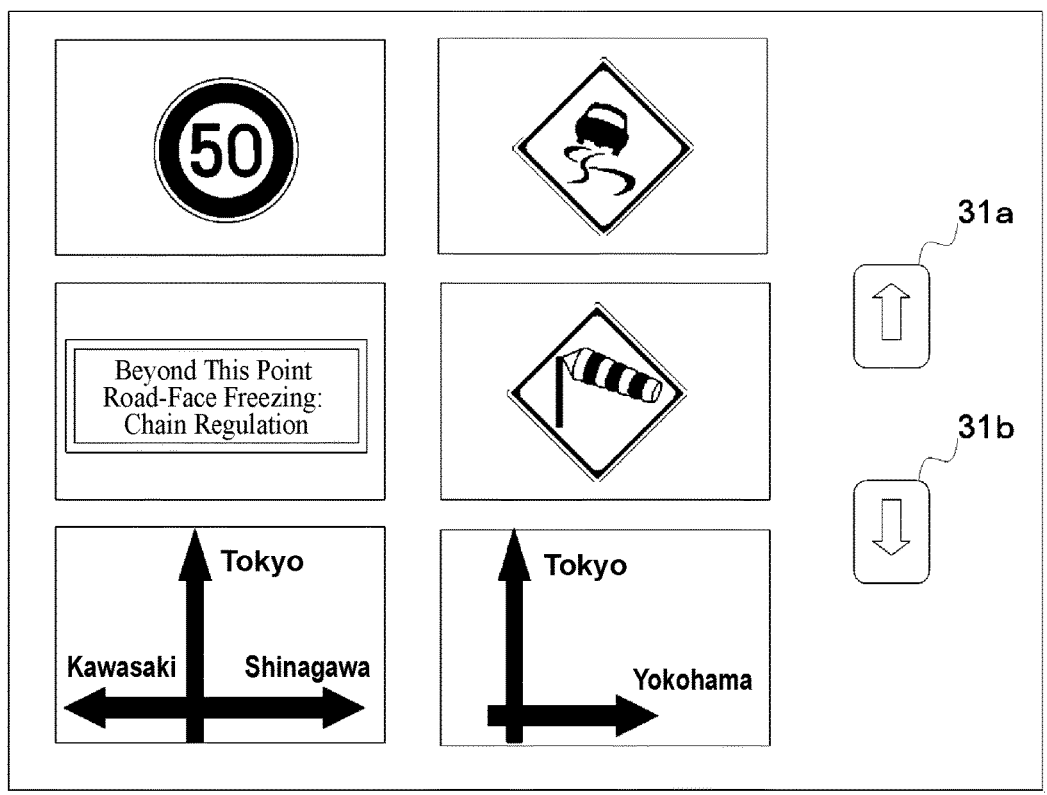
FIG. 14 is an example of a selection screen generated by the image generator according to Embodiment 3, and is a diagram in which a messaging object corresponding to violation of legal regulation is preferentially displayed.

Next, operations of the driving-support-image display system according to Embodiment 3 (for ST2 and following steps, processing steps of a program according to Embodiment 3) will be described using FIG. 10 to FIG. 14. FIG. 10 is an operation flowchart of the driving-support-image display system according to Embodiment 3. FIG. 11 is an example of a table possessed by the messaging-object-content determination processor 44 according to Embodiment 3, in which the identification information and the content of the messaging object are associated with each other. FIG. 12 is an example of the selection screen according to Embodiment 3. FIG. 13 is an example of the selection screen generated by the image generator according to Embodiment 3, and is an example in which the selective displays are highlighted. FIG. 14 is an example of the selection screen generated by the image generator according to Embodiment 3, and is a diagram in which the messaging object corresponding to violation of legal regulation is preferentially displayed. In the following, with respect to the description of FIG. 10, the same numerals as in FIG. 6 are given to the steps equivalent to those in the operations of the driving-support-image display system according to Embodiment 1, so that their description is omitted here. Further, it is assumed that the image generator 43 is set as its display mode so as to "preferentially display a safety-related messaging object".

In ST31, the messaging-object-content determination processor 44 acquires the driving-support image generated in ST1 and ST2 from the messaging-object recognition processor 41. Further, the messaging-object-content determination processor 44 determines the content of the acquired driving-support image by using character recognition, pattern matching or the like.

In ST32, the messaging-object-content determination processor 44 stores the driving-support image whose content has been recognized in ST31, to be associated with identification information corresponding to the content of the driving-support image (messaging object) into the driving-support-image memory 42. For example, in the messaging-object-content determination processor 44, a table is stored that includes the contents of messaging objects classified beforehand in such a manner that the same class of contents, namely, the messaging objects in the same category are associated with the same identification information, so that the identification information is determined based on the table. For example, in FIG. 11, in the line of identification information "1", contents of safety-related messaging objects are associated with that information. The messaging-object-content determination processor 44 determines the content of the driving-support image and, when the driving-support image is determined to mean "chain regulation", stores the driving-support image to be associated with the identification information "1" into the driving-support-image memory 42. Meanwhile, in the line of identification information "2" in FIG. 11, contents of the regulation-information-related messaging objects are associated with that information. If, in ST31, the driving-support image is determined to mean "right-turn prohibition" by the messaging-object-content determination processor 44, in ST32, the driving-support image is stored into the driving-support-image memory 42 to be associated with the identification information "2", by the messaging-object-content determination processor 44.

When an order to display a driving-support image is given in ST4, the image generator 43 generates a selection screen in ST51. In this example, since the display mode is to "preferentially display a safety-related messaging object", the image generator 43 retrieves from the driving-support-image memory 42, the driving-support image associated with the identification information "1" indicative of a safety-related messaging object. The image generator 43 generates the selection screen by using the driving-support image obtained by being retrieved.

In ST6 and ST7, the driving-support-image display system displays the selection screen, and then displays, when the passenger operates the selection button 31 in this selection screen, his/her desired driving-support image. For example, as shown at A of FIG. 12, in the selection screen, the safety-related driving-support image can be preferentially displayed. Shown at A of FIG. 12 is the driving-support image of the messaging object indicative of being slippery.

Note that, when there are plural safety-related driving-support images in the driving-support images stored in the driving-support-image memory 42 according to this embodiment, it is also allowable that the image generator 43 is configured to display, among the plural safety-related driving-support images, the driving-support image starting from that corresponding to the location closest to the current location of the vehicle. Namely, it is allowable that such operations are executed in combination with the driving-support-image display system according to Embodiment 1.

Further, the driving-support-image display system according to this embodiment may be configured so as to display, as the selection screen, a selection screen only related to safety, not to display the others.

Further, in the driving-support-image display system according to this embodiment, it is assumed that the image generator 43 displays, in the selection screen, the selective display to be preferentially displayed according to the display mode; however, the image generator may be configured not only to change the order to display, but also to generate the selection screen in which the driving-support image is subjected to highlighting display on the basis of the set-up display mode. For example, as shown in FIG. 13, frames for highlighting the safety-related driving-support images in the selection screen may be compounded. Further, "highlighting display" is not limited to putting the frame, and just has to be able to highlight the driving-support image, such as to blink, to change in contrast or to enlarge the driving-support image, to put characters like "Danger", or the like.

Further, in the driving-support-image display system according to this embodiment, the image generator 43 may be configured to acquire, when the display mode putting preference on a legal-regulation-related driving-support image is selected, information related to a speed, etc. of the host vehicle from an in-vehicle instrument (not shown), such as a speed meter, to thereby preferentially display the driving-support image related to violation of speed limit. For example, let's assume that the host vehicle is traveling at 80 km on a road on which a messaging object indicative of a speed limit of 50 km is posted. In this case, the messaging-object-content determination processor 44 compares the content of the messaging object with the information from the in-vehicle instrument such as a speed meter, and in a violating case, gives identification information indicative of the violation to be associated with the driving-support image indicative of the speed limit of 50 km. The image generator 43 retrieves the driving-support image having been determined to correspond to that violation based on the identification information, and displays highlightingly the selective display corresponding to the driving-support image indicative of the speed limit of 50 km at the left-upper side in the selection screen, as shown in FIG. 14.

Furthermore, in the driving-support-image display system according to this embodiment, the content of the messaging object may be an image quality. For example, the messaging-object-content determination processor 44 is provided with an image-quality determination means (not shown) that determines the image quality of the driving-support image to be poor when the image quality is equal to or less than a specified threshold value, and when the image quality is determined to be poor, the image is associated with identification information indicative that the driving-support image is poor in image quality, to be associated with that image. The image generator 43 can preferentially display the selective display of the driving-support image whose image quality is good. By configuring to do so, it is possible to preferentially display the selective display of the driving-support image whose image quality is good, so that there is no necessity for the passenger to determine the image quality by him/herself.

Further, the driving-support-image display system according to this embodiment is assumed to display, in the selection screen, the selective display that represents the driving-support image; however, this is not limitative, and a selective display that represents a content of the driving-support image may be displayed therein. For example, it is allowable to display: a type of the messaging object, such as "signpost", "regulatory sign" or the like; or a display that directly represents a content of the messaging object, such as "watch for fallen rocks", "go slow" or the like.

As described above, the driving-support-image display system according to Embodiment 3 generates the selection screen on the basis of the content of the messaging object. This makes it possible, at the time of retroactively confirming the messaging object, to preferentially display the driving-support-image display necessary for the passenger, to thereby reduce the retrieval load of the passenger.

Embodiment 4

Figure 15:
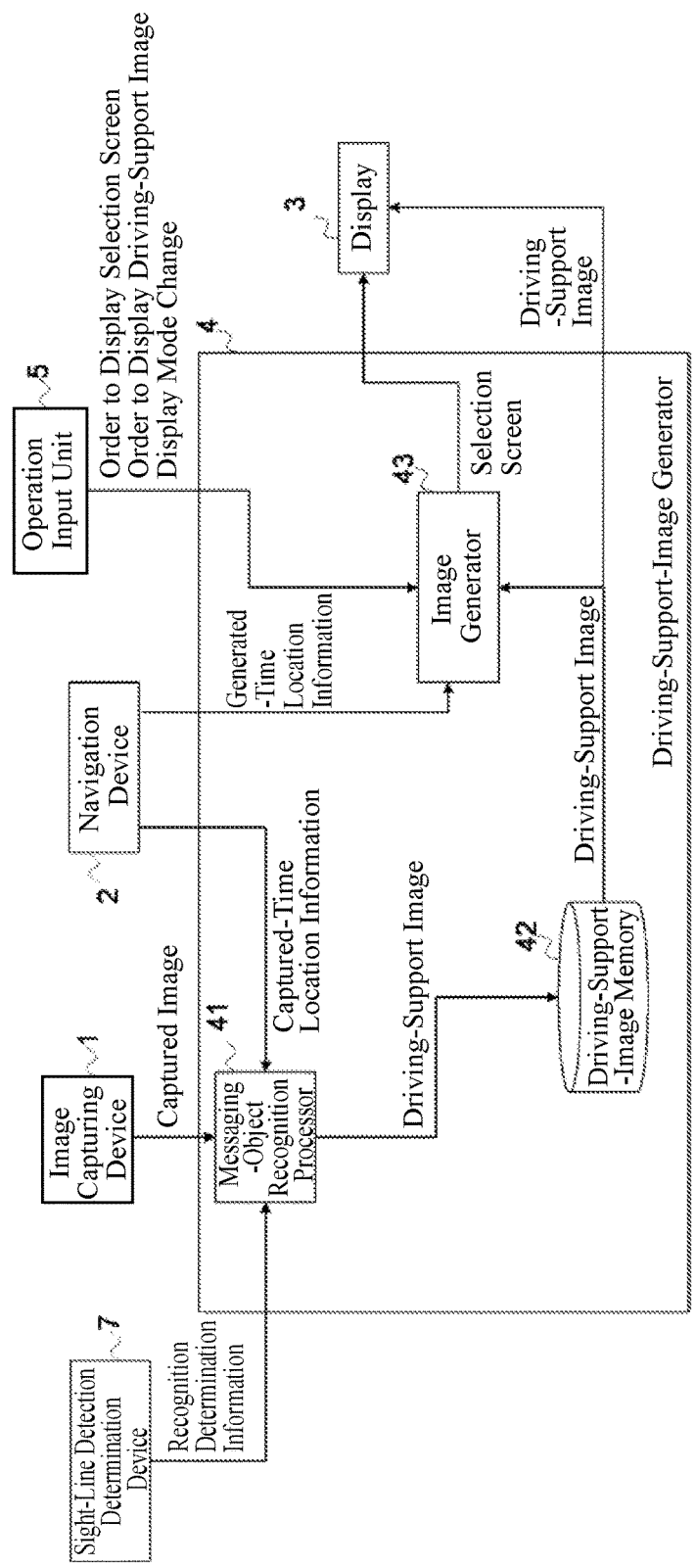
FIG. 15 is a configuration diagram of a driving-support-image display system according to Embodiment 4, which is a diagram in which a configuration of a driving-support-image generator is shown in detail.
Figure 16:
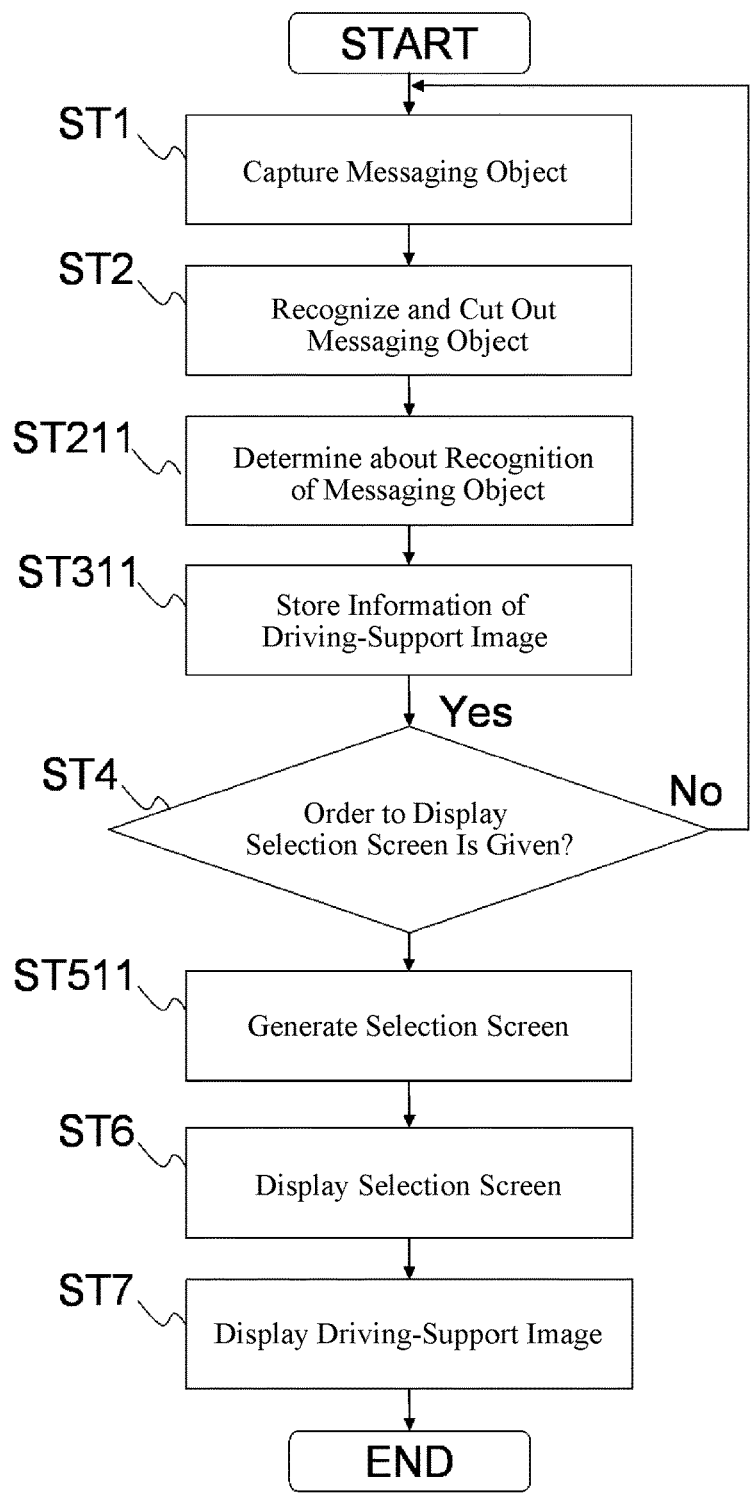
FIG. 16 is an operation flowchart of the driving-support-image display system according to Embodiment 4.

In the following, a configuration of a driving-support-image display system according to Embodiment 4 will be described using FIG. 15 and FIG. 16. FIG. 15 is a configuration diagram of the driving-support-image display system according to Embodiment 4, which is a diagram in which a configuration of a driving-support-image generator is shown in detail. FIG. 16 is an operation flowchart of the driving-support-image display system according to Embodiment 4.

The driving-support-image display system according to Embodiment 4 is characterized by comprising a sight-line detection determination device 7 that detects the sight line of the passenger to thereby determine whether or not he/she has recognized a messaging object.

A configuration of the driving-support-image display system according to Embodiment 4 will be described using FIG. 15, as follows. Note that with respect to the description of FIG. 15, the same reference numerals as in FIG. 2 and FIG. 9 are given to the parts equivalent to those in the configurations of the driving-support-image display systems of Embodiment 1 to Embodiment 3, so that their description is omitted here.

The sight-line detection determination device 7 is placed inside the vehicle and provided with a camera for detecting sight-line information indicative of a direction of the sight line of the passenger. Further, the sight-line detection determination device 7 constantly monitors the sight-line information to thereby determine whether or not the passenger has recognized the messaging object. The sight-line detection determination device 7 is connected by wire or wirelessly to the image capturing device 1, the navigation device 2, the display 3 and the driving-support-image generator 4, that are shown in FIG. 1, by way of the in-vehicle LAN 6.

The sight-line detection determination device 7 is set with a predetermined time and, when the sight line of the passenger is directed for the predetermined time in a direction in which the messaging object is located, determines that the passenger has recognized the messaging object. When determined that the passenger has not recognized the messaging object, the sight-line detection determination device 7 outputs recognition determination information which is indicative that the passenger has not recognized the messaging object to the messaging-object recognition processor 41.

In the following, operations of the driving-support-image display system (for ST2 and following steps, processing steps of a program according to Embodiment 4) will be described using FIG. 16. With respect to the description of FIG. 16, the same numerals as in FIG. 6 and FIG. 10 are given to the steps equivalent to those in the operations of the driving-support-image display systems according to Embodiment 1 to Embodiment 3, so that their description is omitted here.

In ST211, the sight-line detection determination device 7 performs determining whether or not the passenger has recognized the messaging object captured in ST1. Note that, during ST1 and ST2, the sight-line detection determination device 7 is assumed to have detected the sight-line information of the passenger. Further, the sight-line detection determination device 7, when determined that the passenger has not recognized the messaging object captured by the image capturing device 1, outputs the recognition determination information to the messaging-object recognition processor 41.

In ST311, the messaging-object recognition processor 41, when received the recognition determination information from the sight-line detection determination device 7, stores the identification information indicative that the passenger has not recognized the messaging object, and the driving-support image, to be associated together, into the driving-support-image memory 42.

The driving-support-image generator 4, when received an operation for displaying the selection screen from the operation input unit 5 in ST4, executes processing in ST511.

In ST511, the image generator 43 preferentially acquires from the driving-support-image memory 42, the driving-support image associated with the identification information indicative that the passenger has not recognized the messaging object, to thereby generate the selection screen.

In the above description, it is assumed that the sight-line detection determination device 7, when determined that the passenger has not recognized the messaging object, outputs the recognition determination information to the messaging-object recognition processor 41; however, it is also allowable to configure so that the sight-line detection determination device 7 outputs the recognition determination information to the image generator 43, and the image generator 43, when received the recognition determination information, generates the selection screen. When thus configured, it is possible, when the passenger has overlooked the messaging object, to automatically display the driving-support image without depending on the passenger's operation.

As described above, the driving-support-image display system according to Embodiment 4 preferentially displays in the selection screen the messaging object that the passenger has not recognized. This allows the passenger, when going to retroactively confirm the messaging objects, to easily confirm the messaging object that he/she has overlooked.

Embodiment 5

The driving-support-image display system according to Embodiment 5 is characterized in that it displays one or plural most-preferential driving-support images without generating the selection screen.

Figure 17:
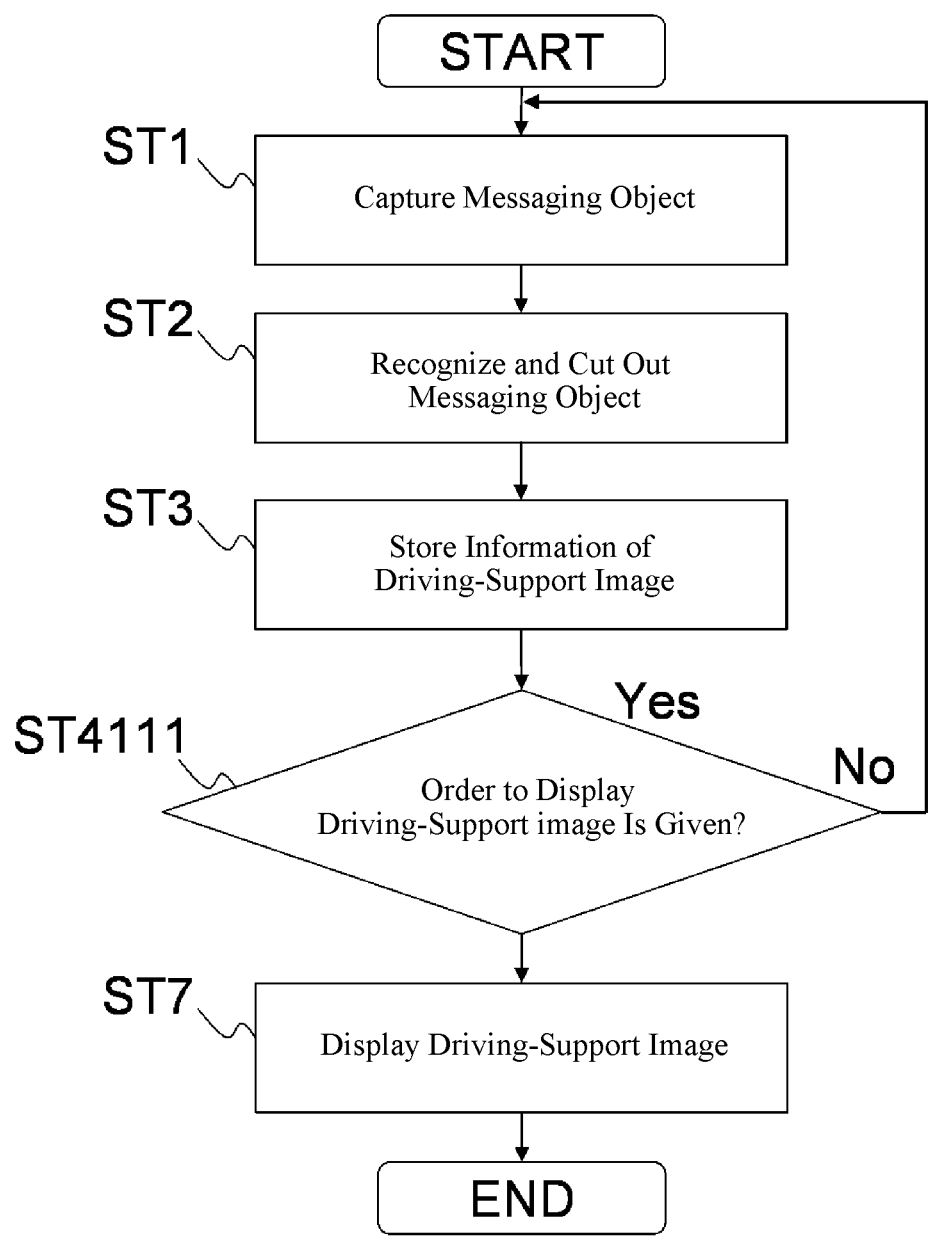
FIG. 17 is an operation flowchart of a driving-support-image display system according to Embodiment 5.

In the following, operations of the driving-support-image display system according to Embodiment 5 (for ST2 and following steps, processing steps of a program according to Embodiment 5) will be described using FIG. 17. FIG. 17 is an operation flowchart of the driving-support-image display system according to Embodiment 5. With respect to the description of FIG. 17, the same numerals as in FIG. 6, FIG.

10 and FIG. 16 are given to the portions equivalent to those in the operations of the driving-support-image display system according to Embodiment 1, so that their description is omitted here. Further, the configuration of the driving-support-image display system according to Embodiment 5 is assumed to be similar to those shown in FIG. 1, FIG. 2, FIG. 9 and FIG. 15, so that its description is omitted here.

In ST4111, the image generator 43 confirms whether or not an order to display a driving-support image is given from the operation input unit 5. When an order to display a driving-support image is given, the image generator goes to ST7 to thereby read out the driving-support image according to the set-up display mode, and then displays it on the display 3. In the operation for displaying the driving-support image, the image generator 43 may read out to display the driving-support image for each order to display and in a sequential order according to the display mode, or may collectively read out the driving-support images beforehand to thereby successively display them for each order to display.

Instead, the image generator 43 may be configured to display the driving-support image automatically without depending on the order to display in ST4111. For example, in the case of violation of legal information, the image generator displays an image of the messaging object related to the legal information, as the driving-support image.

As described above, the driving-support-image display system according to Embodiment 5 displays the most preferential driving-support image according to the display mode, without displaying the selection screen, so that the passenger can save the trouble of making operation on the selection screen.

Embodiment 6

Figure 18:
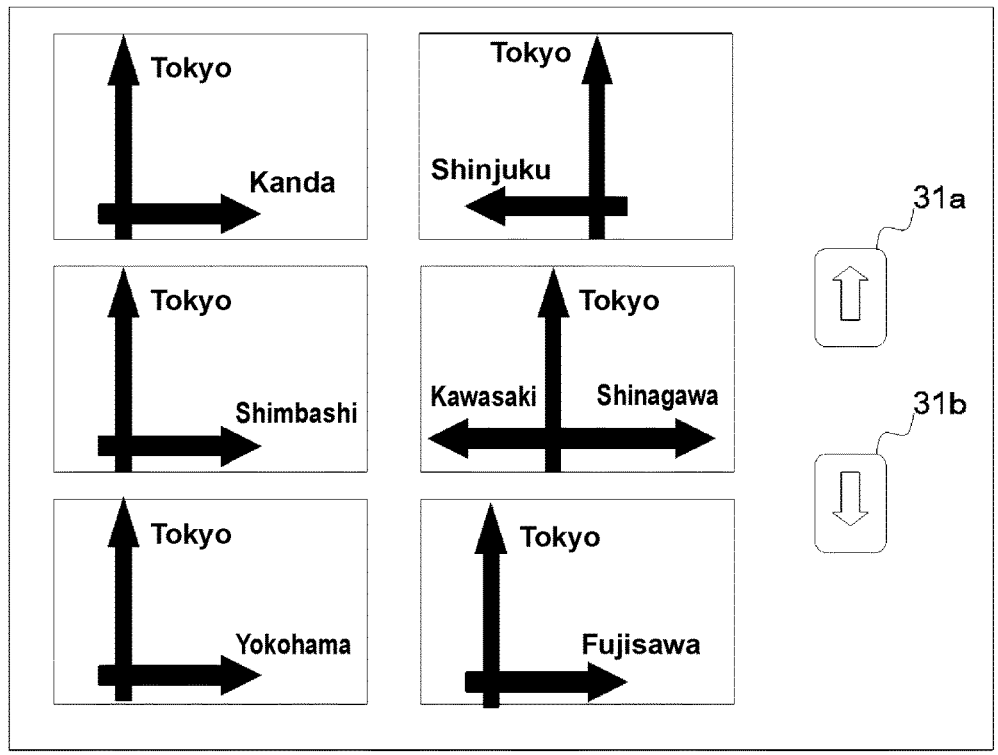
FIG. 18 is an example of a selection screen generated by an image generator according to Embodiment 6.
Figure 19:
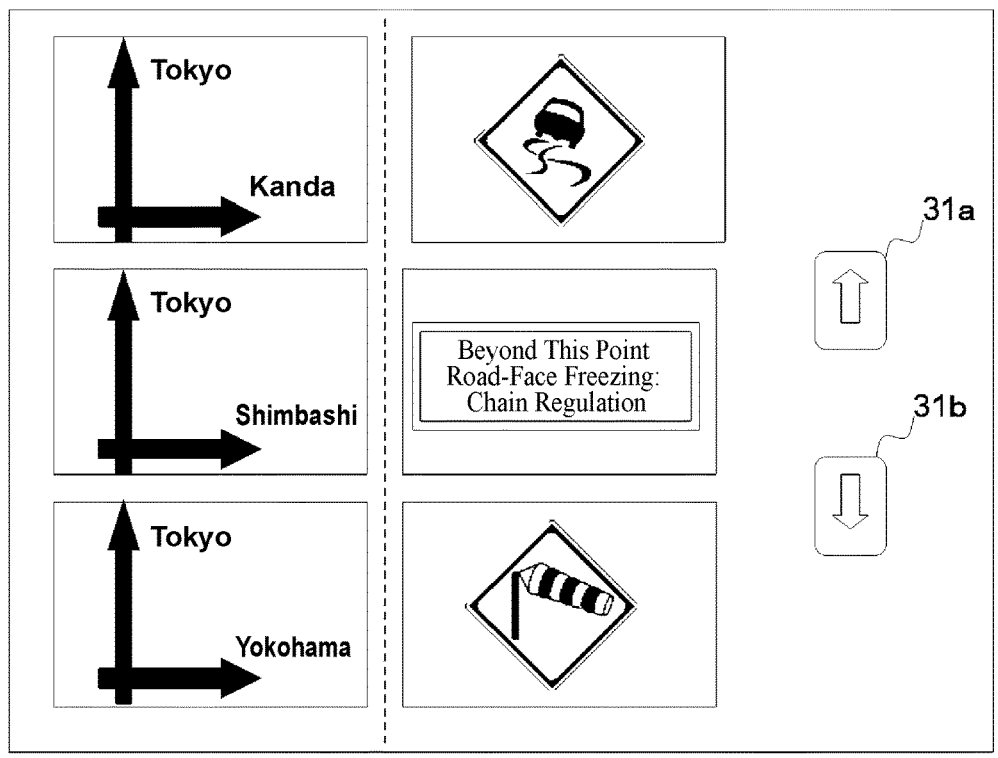
FIG. 19 is another example of the selection screen generated by the image generator according to Embodiment 6.

In Embodiment 6, using FIG. 18 and FIG. 19, description will be made about display forms by the driving-support-image display systems according to Embodiment 1 to Embodiment 5. FIG. 18 is an example of the selection screen generated by the image generator according to Embodiment 6. FIG. 19 is another example of the selection screen generated by the image generator according to Embodiment 6.

In the descriptions of the driving-support-image display systems according to Embodiment 1 to Embodiment 5, it is assumed that one of the selective displays or driving-support images is displayed on the display 3; however, it is possible to configure so that plural selective displays or driving-support images are displayed simultaneously.

For example, as shown in FIG. 18, the image generator 43 may generate the selection screen in which plural selective displays are displayed simultaneously. Even in this case, the image generator 43 generates the selective displays in the sequential order based on the display mode. For example, the display mode is in captured order of messaging objects, the selective displays are displayed at upper left, upper right, right center, left center, lower left and lower right, in this order, in FIG. 18. Note that the order is not limited thereto, and may be changed appropriately, in such a manner that, for example, they are displayed at upper right, upper left, right center, left center, lower right and lower left, in this order.

Further, in the description of FIG. 18, it is assumed that the image generator 43 displays the messaging objects in one common category; however, the messaging objects in plural categories may be displayed simultaneously. For example, the image generator 43 may displays on the display 3, an "intersection-related messaging object" and a "safety & regulation-related messaging object" as the categories subject to displaying. Specifically, as shown in FIG. 19, each "intersection-related messaging object" is displayed on the left half of the selection screen, while each "safety & regulation-related messaging object" is displayed on the right half of the selection screen. Instead, it is allowable to provide indications for selecting a category of the messaging object to be displayed (for example, "Intersections", "Safety & Regulations") so that only the messaging objects in the selected category is displayed on the display 3. For example, when the passenger wants to confirm the safety & regulation-related messaging objects that he/she has overlooked, selection of "Safety & Regulations" make it possible to preferentially display the safety & regulation-related messaging objects, only.

When the messaging objects in different categories are to be displayed in this manner, it is allowable to provide a plurality of displays 3 to thereby simultaneously display thereon the selection screens for the messaging objects in the different categories, respectively. For example, it is even allowable that the image generator 43 causes one of the displays 3 to display the driving-support image of "intersection-related messaging object", and causes the other of the displays 3 to display that of "safety & regulation-related messaging object".

Meanwhile, the image generator 43 according to this embodiment is also applicable to the driving-support-image display system according to Embodiment 5 in which the most preferential driving-support image is displayed without displaying the selection screen.

Note that in the driving-support-image display systems according to Embodiment 1 to Embodiment 6, it is assumed that the display mode that determines the order of priority of each driving-support image to be displayed, is selected by the passenger using the operation input unit 5; however, it may be selected by the voice of the passenger. Further, it is allowable to periodically change the display mode automatically.

Further note that in the driving-support-image display systems according to Embodiment 1 to Embodiment 6, it is assumed that at every time of capturing by the image capturing device 1, the driving-support image is stored into the driving-support-image memory 42; however, it is not necessarily required to store the driving-support image at every time of capturing, into the driving-support-image memory 42. For example, it is also thought that a driving-support image at the previously once passed location has been already stored in the driving-support-image memory 42. For that case, the driving-support-image display system may be configured to read out, when the vehicle has passed the same location again, the driving-support image based on the location information of the vehicle received from the navigation device 2, to thereby display the selection screen or the driving-support image. When thus-configured, an operation of capturing the messaging object by the image capturing device 1 can be omitted, so that the load of the device can be reduced.

Further, the driving-support-image display systems according to Embodiment 1 to Embodiment 6 may receive information of a driving-support image captured by another vehicle, in place of reading out the driving-support image in the host vehicle. For example, when the other vehicle equipped with the support-image display system according to any one of Embodiment 1 to Embodiment 6 transmits to and stores in an external server the information of a driving-support image that was previously captured and cut out, this makes it possible for the driving-support-image generator 4 to acquire the information of the driving-support image by making access to the server through a roadside device, etc. placed on a road.

Furthermore, in the description of the driving-support-image generators 4 according to Embodiment 1 to Embodiment 6, the messaging-object recognition processor 41 is assumed to obtain the driving-support image cut out from the captured image without change; however, this is not limitative, and the driving-support image may be prepared from scratch using CG (Computer Graphics) corresponding to the captured messaging object. In the case where the driving-support image is to be prepared using CG, the driving-support-image generator 4 comprises a memory (not shown) that stores beforehand a CG image corresponding to the messaging object, or a part of a CG image partly corresponding to the messaging object, to thereby generate a messaging-object CG image that corresponds to the messaging object captured by the image capturing device 1. In the case where the driving-support image is to be prepared using CG, the messaging-object recognition processor 41 just has to recognize the messaging object from the captured image captured by the image capturing device 1, and to store a CG image corresponding to the recognized messaging object into the driving-support-image memory 42.

Further, the driving-support-image display systems according to Embodiment 1 to Embodiment 6 may use information of an image that is indicative of the content of a messaging object and is stored beforehand together with map data, instead of generating the driving-support image on the basis of the captured image.

Note that, when the captured image is used, newest accurate information can be displayed as the driving-support image even if the content of the actual messaging object has been changed or a new messaging object has been posted. For example, with respect to the messaging objects posted on a road or around a road, although a new one will be posted according to new construction of a road, when an image obtained by capturing the thus-posted new messaging object is used, it is possible to obtain a newest driving-support image even if there is no information of an image that is indicative of the content of that messaging object and is stored beforehand together with map data.

Note that each of the driving-support-image generators 4 according to Embodiment 1 to Embodiment 6 is assumed to be provided in a vehicle; however, it is not limited to being so provided, and may be provided in a server or the like placed at a specific place outside the vehicle. For example, the display provided in the vehicle may be configured to receive, by wireless communication, the driving-support image generated by a driving-support-image generator 4 provided on the server side. Further, the display 3 may be configured to be connected to a communication means such as a smartphone or the like by wire or wirelessly, to thereby make communication with the server through the smartphone.

Further, the characteristic configurations of the driving-support-image display systems according to Embodiment 1 to Embodiment 6 may be installed in a single common driving-support-image display system.

DESCRIPTION OF REFERENCE NUMERALS AND SIGNS

1: image capturing device, 2: navigation device, 3: display, 4: driving-support-image generator, 5: operation input unit, 6: in-vehicle LAN, 7: sight-line detection determination device, 41: messaging-object recognition processor, 42: driving-support-image memory, 43: image generator, 44: messaging-object-content determination processor.

The invention claimed is:

1. A driving-support-image generation device configured to receive driving support images to-be-obtained from a camera mounted on a vehicle comprising:
   a driving-support-image memory that stores a plurality of driving-support images each indicative of a message content of a messaging object posted on or around a road on which the vehicle is traveling; and
   an image generator that
   selects, from among the driving-support images stored in the driving-support-image memory on a basis of a pre-set order of priority identified by a passenger selected display mode selected from among plural display modes having different orders of priority of image display, one or plural driving-support images, each indicative of the message content of the messaging object having been passed by the vehicle that travels on the road to a destination point, and
   generates, using the thus-selected driving-support images, an image to be displayed on a display in the vehicle.

2. The driving-support-image generation device of claim 1, wherein the driving-support-image memory stores the driving-support images to be each associated with information related to a vehicle location; and
   wherein the image generator selects, based on the information related to a vehicle location, the driving-support images to be used for the generation of said image, from among the plurality of driving-support images stored in the driving-support-image memory.

3. The driving-support-image generation device of claim 1, further comprising a sight-line detection determination device that determines whether or not a passenger in the vehicle has recognized the messaging object,
   wherein, the driving-support-image memory performs said storing so that information from the sight-line detection determination device being indicative that the messaging object has not been recognized by the passenger in the vehicle, is associated correspondingly, when so determined; and
   wherein the image generator preferentially selects the driving-support image associated with the information indicative that the messaging object has not been recognized, from among the driving-support images stored in the driving-support-image memory.

4. The driving-support-image generation device of claim 1, wherein the image generator generates a selective display that allows a passenger to select the driving-support image to be displayed, using the selected driving-support images or identification information corresponding to the driving-support images.

5. The driving-support-image generation device of claim 1, wherein the image generator selects the plural driving-support images from among those stored in the driving-support-image memory and generates the image in which the thus-selected plural driving-support images are displayed simultaneously.

6. The driving-support-image generation device of claim 1, further comprising a messaging-object-content determination processor that determines a content of the messaging object;
   wherein the driving-support-image memory stores the driving-support images to be each associated with information indicative of the content of the messaging object determined by the messaging-object-content determination processor; and wherein the image generator selects based on the content of the messaging object, the driving-support image to be used for the generation of said image, from among the plurality of driving-support images stored in the driving-support-image memory.

7. The driving-support-image generation device of claim 6, wherein the image generator selects the plural driving-support images of messaging objects having different types of contents, from among the plurality of driving-support images stored in the driving-support-image memory, and generates said image for each of the types on the basis of the thus-selected plural driving-support images.

8. A driving-support-image display device configured to receive driving support images obtained from a camera mounted on a vehicle comprising:
   a display that displays a driving-support image indicative of a message content of a messaging object posted on or around a road on which a vehicle is traveling,
   wherein the display displays an image including the driving-support images indicative of the contents of one or plural messaging objects having been passed by the vehicle that travels on a road to a destination point, the one or plural messaging objects being selected from among a plurality of messaging objects on the basis of a pre-set order of priority identified by a passenger selected display mode selected from among plural display modes having different orders of priority of image display.

9. The driving-support-image display device of claim 8, wherein the display displays the image on the basis of the order of priority being set according to a vehicle location.

10. The driving-support-image display device of claim 8, wherein the display displays the image including the driving-support images indicative of the contents of one or plural messaging objects selected on the basis of said order of priority, when a passenger in the vehicle does not recognize the messaging objects.

11. The driving-support-image display device of claim 8, wherein the display displays a selection screen that allows a passenger to select the driving-support image to be displayed.

12. The driving-support-image display device of claim 8, wherein the display simultaneously displays the plural driving-support images.

13. A driving-support-image display system, comprising:
   a camera that captures a messaging object posted on a road or around a road on which a vehicle is traveling, and
   a driving-support-image display device which comprises:
      a driving-support-image memory that stores a plurality of driving-support images each indicative of a message content of the messaging object captured by the camera;
      an image generator that
         selects, from among the driving-support images stored in the driving-support-image memory on a basis of a pre-set order of priority identified by a passenger selected display mode selected from among plural display modes having different orders of priority of image display, one or plural driving-support images each indicative of the message content of the messaging object having been passed by the vehicle that travels on the road to a destination point, and
         generates an image to be displayed, on the basis of the thus-selected driving-support images; and
      a display in a vehicle that displays the image generated by the image generator.

14. The driving-support-image display device of claim 8, wherein the display displays the image on the basis of the order of priority being set according to the content of the messaging object.

15. The driving-support-image display device of claim 14, wherein the display displays the driving-support images indicative of the messaging objects having different types of contents, for each of the types as said image.

16. A non-transitory computer readable medium storing a driving-support-image generation program that causes a computer to be configured to receive driving support images to be obtained from a camera mounted on a vehicle and to implement:
   processing and storing a plurality of the driving-support images, into a driving-support-image memory, each of the driving-support images indicative of a message content of a messaging object posted on or around a road on which the vehicle is traveling;
   image generation processing of selecting from among the driving-support images stored in the driving-support-image memory on a basis of a pre-set order of priority identified by a passenger selected display mode selected from among plural display modes having different orders of priority of image display, one or plural driving-support images each indicative of the message content of the messaging object having, been passed by the vehicle that travels on the road to a destination point; and
   generating using the thus-selected driving-support images, an image to be displayed on a display in the vehicle.

* * * * *